United States Patent
Suissa et al.

(10) Patent No.: US 9,274,688 B2
(45) Date of Patent: Mar. 1, 2016

(54) INTERFACING SYSTEMS AND METHODS

(71) Applicant: Micro Focus (IP) Development Limited, Newbury, Berkshire (GB)

(72) Inventors: Avihai Suissa, Haifa (IL); Dorian Hugues, Ambronay (FR)

(73) Assignee: MICRO FOCUS (IP) DEVELOPMENT LIMITED, Newbury, Berkshire (GB)

( * ) Notice: Subject to any disclaimer, the term of this patent is extended or adjusted under 35 U.S.C. 154(b) by 214 days.

(21) Appl. No.: 14/106,523

(22) Filed: Dec. 13, 2013

(65) Prior Publication Data

US 2014/0181702 A1    Jun. 26, 2014

Related U.S. Application Data

(60) Provisional application No. 61/737,444, filed on Dec. 14, 2012, provisional application No. 61/834,234, filed on Jun. 12, 2013.

(51) Int. Cl.
G06F 3/0484    (2013.01)

(52) U.S. Cl.
CPC .................. G06F 3/0484 (2013.01)

(58) Field of Classification Search
USPC ........................................................ 715/762
See application file for complete search history.

(56) References Cited

U.S. PATENT DOCUMENTS

| | | | | |
|---|---|---|---|---|
| 6,064,382 A * | 5/2000 | Diedrich | G06F 9/4443 | 703/24 |
| 6,295,075 B1 * | 9/2001 | Janay | G06F 3/0489 | 715/747 |
| 6,532,463 B1 * | 3/2003 | Robbins | G06F 9/541 | |
| 6,961,897 B1 * | 11/2005 | Peel, Jr. | G06F 17/24 | 707/E17.116 |
| 7,647,370 B1 * | 1/2010 | Liu | H04L 67/08 | 709/203 |
| 7,765,523 B2 * | 7/2010 | Kooy | G06F 9/44526 | 715/234 |
| 8,868,515 B2 * | 10/2014 | Lee | H04L 67/06 | 707/612 |
| 9,055,002 B2 * | 6/2015 | Lategan | G06F 8/70 | |
| 2002/0087729 A1 * | 7/2002 | Edgar | H04L 29/06 | 709/246 |
| 2003/0149646 A1 * | 8/2003 | Chen | G06Q 40/02 | 705/35 |
| 2003/0163403 A1 * | 8/2003 | Chen | G06Q 40/06 | 705/36 R |
| 2004/0015842 A1 * | 1/2004 | Nanivadekar | G06F 8/34 | 717/109 |
| 2004/0117376 A1 * | 6/2004 | Lavin | G06Q 30/06 | |
| 2004/0205612 A1 * | 10/2004 | King | G06F 17/218 | 715/235 |
| 2007/0106647 A1 * | 5/2007 | Schwalb | G06F 17/30011 | 705/314 |
| 2007/0244802 A1 * | 10/2007 | Scruton | G06Q 10/10 | 705/37 |
| 2008/0022257 A1 * | 1/2008 | Baartman | G06F 8/51 | 717/106 |
| 2009/0100344 A1 * | 4/2009 | Heuler | G06F 17/30902 | 715/733 |

(Continued)

FOREIGN PATENT DOCUMENTS

WO    WO 2011/053729    5/2011

OTHER PUBLICATIONS

Wayne Madden, "From Green Screen to GUI", System iNEWS Magazine, Nov. 1, 1995 (4 pages).

(Continued)

*Primary Examiner* — Reza Nabi
(74) *Attorney, Agent, or Firm* — DLA Piper LLP (US)

(57) ABSTRACT

Systems and methods may replace and/or enhance green screens. A green screen may be replaced and/or enhanced by receiving green screen data, determining a modification to be applied to the green screen data, generating a user interface screen including the green screen data and the modification, and causing the user interface screen to be displayed on a display.

24 Claims, 20 Drawing Sheets

(56) References Cited

U.S. PATENT DOCUMENTS

2009/0113017 A1* 4/2009 Parcher ............. G06F 17/30905
709/207
2014/0181702 A1* 6/2014 Suissa ................... G06F 3/0484
715/762

OTHER PUBLICATIONS

Office Action issued in United Kingdom Application No. GB1322120.5 dated Mar. 13, 2014.
Office Action issued in United Kingdom Application No. GB1322120.5 dated Feb. 4, 2015.
Office Action issued in United Kingdom Application No. GB1322120.5 dated May 18, 2015.
Office Action issued in United Kingdom Application No. GB1300966.7 dated Aug. 12, 2013.
Office Action issued in United Kingdom Application No. GB1300966.7 dated Feb. 4, 2015.
Office Action issued in United Kingdom Application No. GB1300966.7 dated May 18, 2015.

* cited by examiner

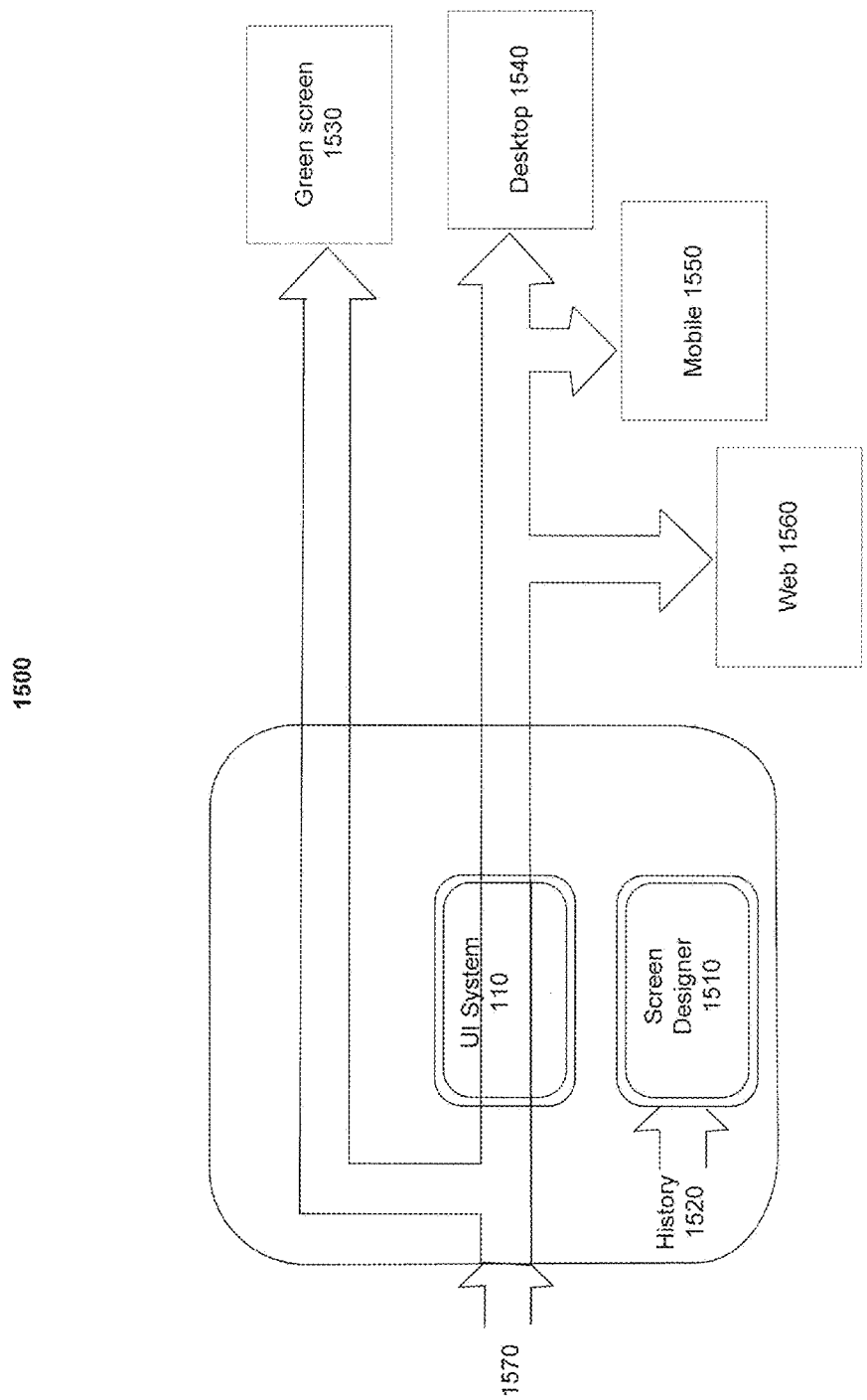

```
ACCOUNT FILE: MENU

TO SEARCH BY NAME, ENTER:                    ONLY SURNAME
                                                 REQUIRED. EITHER
        SURNAME:              FIRST NAME:        MAY BE PARTIAL.

REQUEST TYPE:     ACCOUNT:       PRINTER:    PRINTER REQUIRED
                                                 ONLY FOR PRINT
    REQUEST TYPES:  D = DISPLAY    A = ADD    X = DELETE    REQUESTS.
                    P = PRINT      M = MODIFY

THEN PRESS "ENTER"         -OR-  PRESS "CLEAR" TO EXIT

ACCT    SURNAME    FIRST   MI  TTL  ADDRESS       ST   LIMIT
    44444   SCHETRIT   GUY         MR   NEW ZELAND    N    1000.00
    25874   SHATCHIN   KATIA            USA           N    1000.00
    11125   SKSKS      DKDK             DJDJ          N    1000.00
    78965   SRTYU      SDRTY            YTYR          N    1000.00
    22222   SUISSA     AVIHAI      MR   MATAM         N    1000.00
```

INTERFACING SYSTEMS AND METHODS

CROSS REFERENCE TO RELATED APPLICATIONS

This application claims the benefit of U.S. Provisional Application Nos. 61/737,444, filed Dec. 14, 2012 and 61/834,234, filed Jun. 12, 2013. All of the foregoing are incorporated by reference in their entireties.

BRIEF DESCRIPTIONS OF THE DRAWINGS

FIG. 9 is an interface generating system according to an embodiment of the invention.

FIG. 10 is a green screen according to an embodiment of the invention.

FIG. 15 is a green screen according to an embodiment of the invention.

DETAILED DESCRIPTION OF SEVERAL EMBODIMENTS

Figure 1:
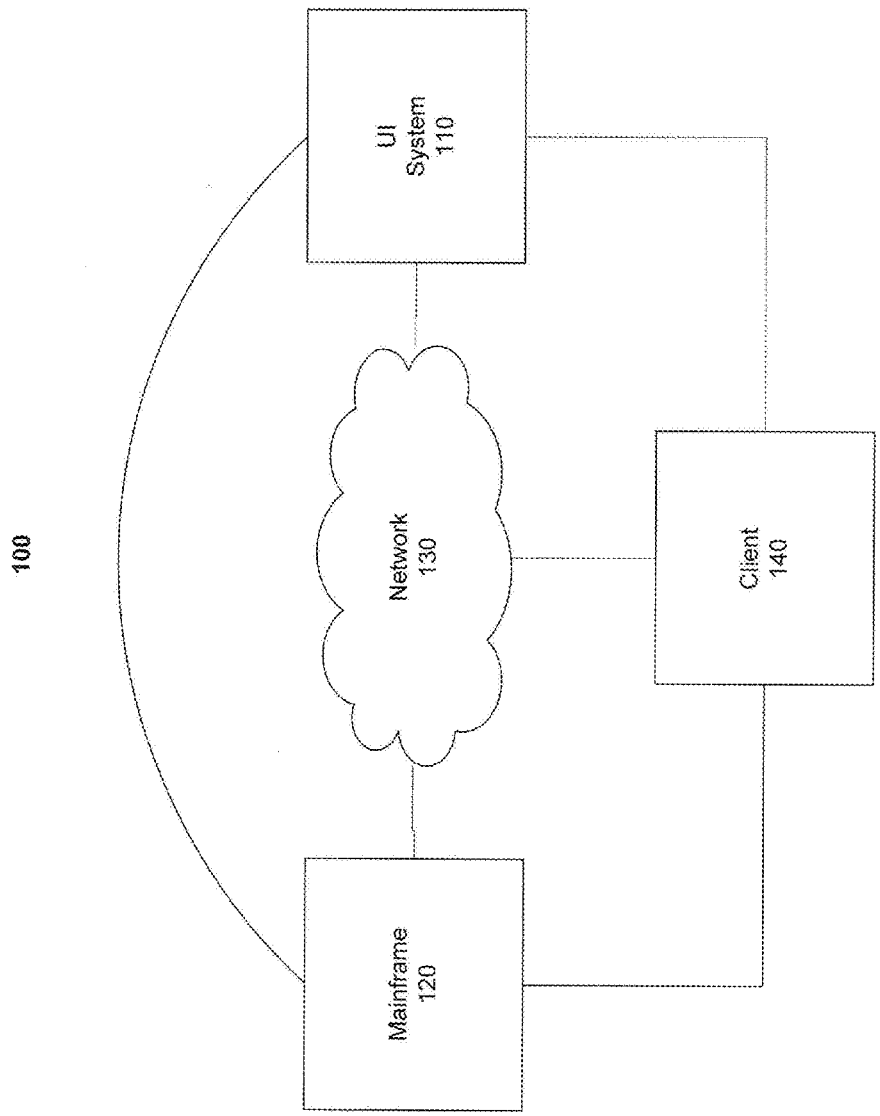
FIG. 1 is a network according to an embodiment of the invention

Green screen interfaces may be used to access some host-based applications. A host may be, for example, a mainframe, iSeries server, Unix server, etc. A green screen may present only text-based information and may accept only text commands. Systems and methods described herein may enable modification and/or replacement of green screens with interfaces that may comprise additional and/or different features and functions. For example, graphical user interfaces (GUIs) may be added into the green screen or may replace parts of green screen interfaces. The added or modified interfaces may provide additional functionality and/or enable easier and/or more intuitive interaction with the mainframe than a standard green screen. Green screens can be merged to present a consolidated view. Such changes may provide ease of use, increased functionality, improved appearance and accessibility, and other advantages. The changes may modernize, make more productive, and simplify data without any code or infrastructure change to the underlying green screens and their related systems. Many tasks may be automated and otherwise hidden or difficult to access data may be revealed to users. In some prior art systems for modernizing green screen displays, extensive and processing intensive middleware architecture may be used to generate new screens. However, these systems may cause a decrease of performance even if they may be able to deliver new screens only through HTML browsers or similar programs on the client side which receive data that has been processed by the middleware system. Systems and methods described herein may provide advantages described above with programs and architecture that may be directly integrated into client devices in some embodiments.

In an embodiment, some devices may use an intermediate server to access host screens. This server may act as a proxy to isolate the host from the client for security or technical reasons. This embodiment of the invention may allow deportation of the rendering features (e.g., UI creation) on another device. The host connection may be done on a server and the UI rendering may be done on the client machine. The server side piece may be platform agnostic and run on every operating system (e.g., that supports Java).

Web socket technology, which comprises a protocol providing full-duplex communications channels over a single transmission control protocol (TCP) connection, may be utilized. The server may use web socket technologies to maintain live connection between itself and the clients to improve performances. Another application of the usage of web sockets is the ability of having asynchronous communication (e.g., a message driven (i.e. pushed) from the server).

Devices operating the various applications and performing the various processes described herein may comprise one or more computers. Computers may be linked to one another via a network or networks. A computer may be any programmable machine capable of performing arithmetic and/or logical operations. In some embodiments, computers may comprise processors, memories, data storage devices, other commonly known or novel components, or combinations thereof. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, and other terms. It will be understood by those of ordinary skill that those terms used herein are interchangeable, and any computer capable of performing the described functions may be used. For example, though the term "server" may appear in the following specification, the disclosed embodiments are not limited to servers. A network may be any plurality of completely or partially interconnected computers wherein some or all of the computers are able to communicate with one another. It will be understood by those of ordinary skill that connections between computers may be wired in some cases (i.e. via Ethernet, coaxial, optical, or other wired connection) or may be wireless (i.e. via WiFi, WiMax, or other wireless connection). Connections between computers may use any protocols, including connection oriented protocols such as TCP or connectionless protocols such as UDP. Any connection through which at least two computers may exchange data can be the basis of a network.

FIG. 1 is a computer network 100 according to an embodiment of the invention. The network 100 may comprise, for example, a user interface (UI) system 110 (which may reside on a computer or be accessed through network 130 by a computer), a host 120 which may comprise a green screen interface (which may be accessible directly and/or remotely via a computer), or a client 140, or any combination thereof. Note that while FIG. 1 and the subsequent discussion describe a mainframe 120, other systems, such as an iSeries server, Unix server, or other computer system, may be used. As will be described in greater detail below, the system 110 may perform various interface functions. The client 140 may enable a user to interact with the system 110, and/or a user may be able to interact directly with the system 110. The system 110, mainframe 120, and/or client 140 may be directly connected to one another and/or may communicate with one another via network 130 (which may be the internet or an intranet).

Figure 2:
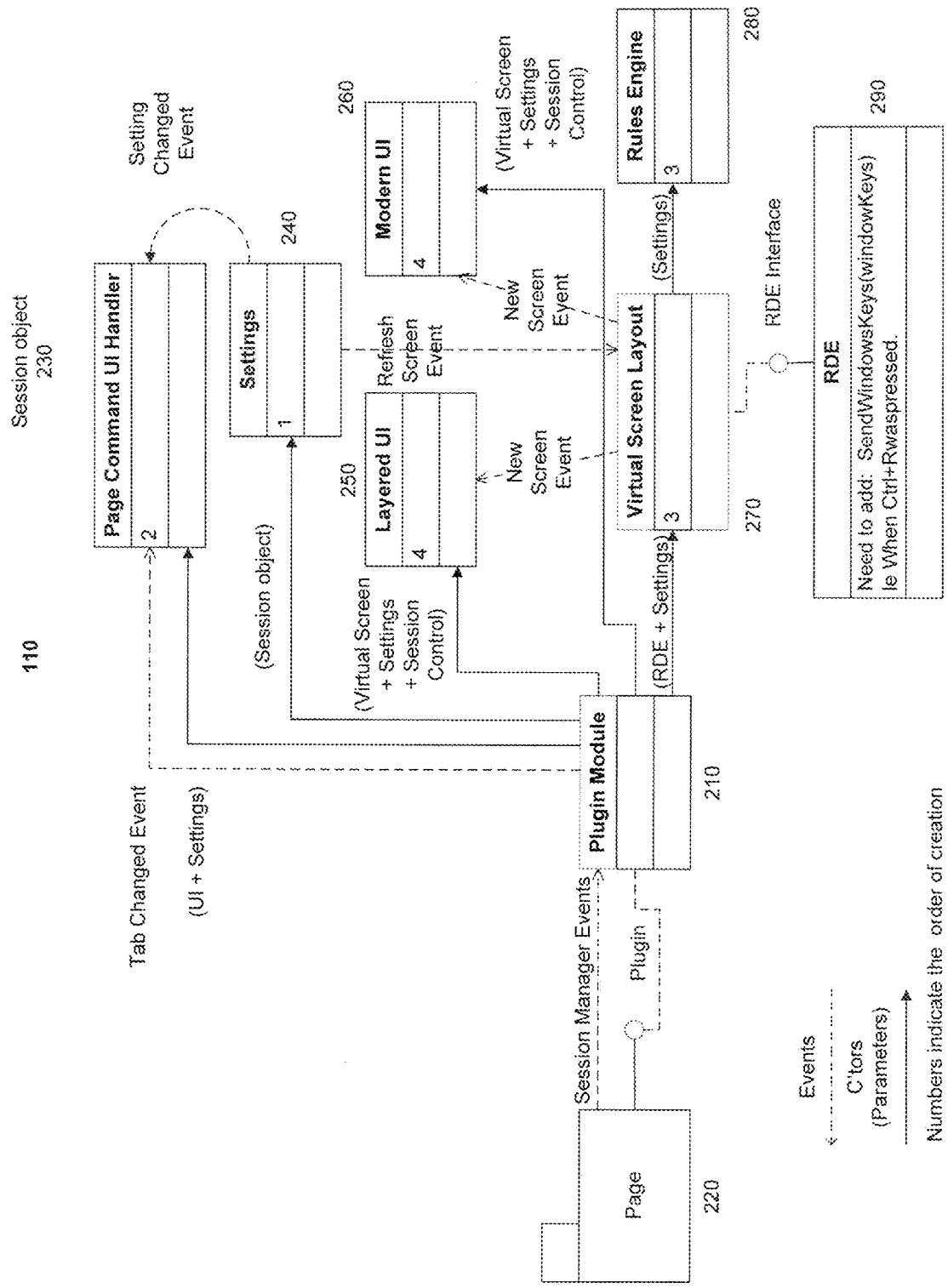
FIG. 2 is an interface generating system according to an embodiment of the invention.

FIG. 2 provides more details on system 110 according to an embodiment of the invention. The system 110 may comprise an interface generating plugin module 210 which may generate modifications of and/or replacements for green screen interfaces, as will be described in greater details below. In some cases, the plugin module 210 may perform other functions as well. Also, in some embodiments, the plugin module 210 may be separate from the other modules described herein, although the discussion below is directed to an example wherein the plugin module 210 is part of the system 110. The interface generating plugin module 210 may output data which may be displayed on a page 220, which may be a GUI in a window or web page or the like. For example, the page 220 may comprise a green screen and additional data which is incorporated into or overlaid on the green screen. The interface generating plugin module 210 may be associated with other modules, such as a page command user interface (UI) handler module 230, settings module 240, layered UI module 250, modern UI module 260, virtual screen layout module 270, rules engine module 280, RDE module 290, or other modules, or any combination thereof. When a new page 220 occurs, an event may be raised to a plug-in manager that may activate the plugin module 210. Using the settings module 240, the rules engine module 280 and virtual screen layout module 270 may create a virtual layout comprising the added controls/GUI that may be rendered by layered UI module 250 or, modern UI module 260. The choice of whether the layered UI module 250 or modern UI module 260 may depend on settings, as described below. The page command UI handler module 230 may manage a switch between different pages, as the system 110 may run several pages in a tabbed environment. RDE module 290 may be used by the controls and the rule engine to access the page content to generate the controls according to conditional criteria.

The page command UI handler module 230 may perform tasks such as handling UI interaction for the generated pages, disabling/enabling menu items in generated page menus, disabling/enabling buttons in generated page toolbars, etc.

Figure 3:
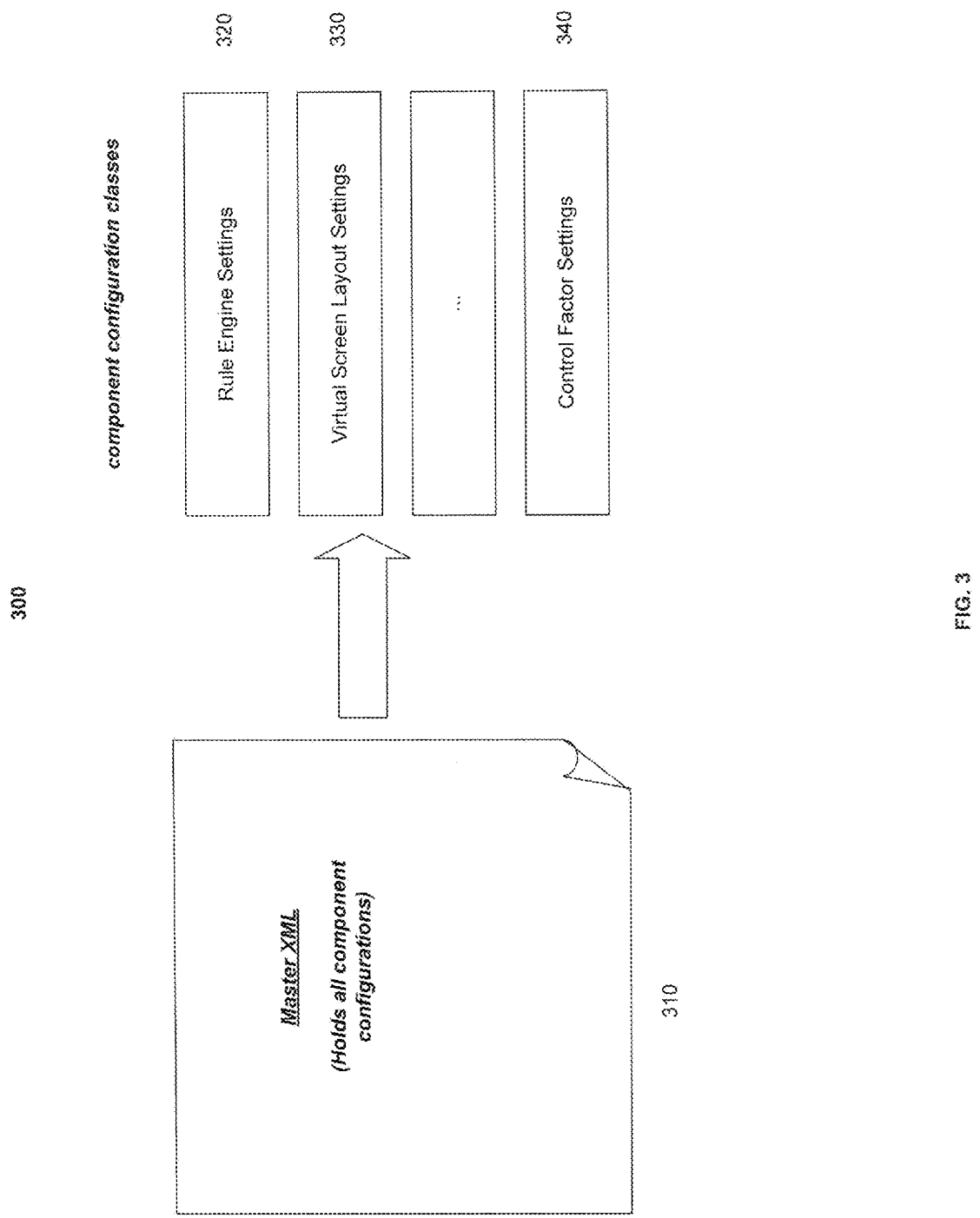
FIG. 3 is a set of configurations according to an embodiment of the invention.

The settings module 240 may identify and/or supply configuration data for use in generating and/or modifying screens. FIG. 3 is a set of configurations 300 according to an embodiment of the invention. The configurations 300 may comprise rules and/or settings which may govern screen modifications and/or replacements. Configurations 300 may be specified by a user, such as an administrator or a session user. The configurations may be input to the system 110 by a user via one or more developer tools, for example, and saved in a memory, a file or database associated with the system 110. In some cases, default configuration settings may also be available. The configurations 300 may be stored as a master repository 310, which may contain all configuration information. Furthermore, the master configuration file 310 may be divisible into component setting classes, for example the rule engine settings 320, virtual screen layout settings 330, and control factory settings 340 shown in FIG. 3. Other classes may be possible, and the illustrated classes may or may not be present in various embodiments. The settings module 240 may perform tasks such as reading, parsing, and/or holding the master configuration file 310 and/or other configuration files, as will be described in greater detail below with respect to FIG. 6.

Returning to FIG. 2, the layered UI module 250 may produce over the existing green screen a layer containing modern controls (WPF) that may interact with the screen. The modern UI module 260 may replace the green screen by a full WPF or HTML5 interface.

Figure 4:
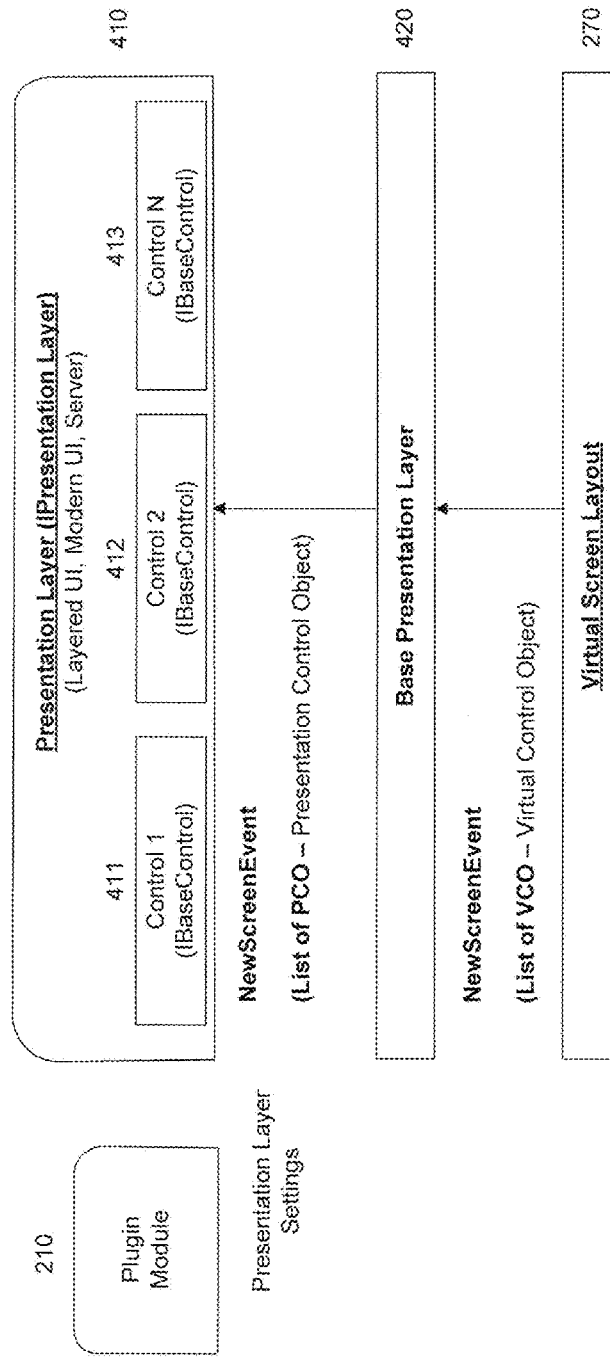
FIG. 4 is an interface generating system according to an embodiment of the invention.

The virtual screen layout (VSL) module 270 may provide the host data (which may be provided by the rules engine module 280) and host interaction information to the presentation layer module 400, which is described in greater detail with respect to FIG. 4 below. A VSL object may be created for each access session. At initialization time, the VSL module 270 may subscribe for RDE events such as HostScreenChange, LocalScreenChange, CursorMove, and the like and may keep references to the session and RDE display interface. The VSL module 270 may also create identification engine instances for data parsing (to identify screen, for example) and virtual control object generation.

The rules engine module 280 may read data on the screen using screen scraping. The rules engine module 280 may execute rules on the host screen and output the host data to create modern controls for the current screen and then may produce a modernized version of this screen. A rule may be a set of patterns and conditions found in the configuration file that may mix host screen and custom control data. Custom control data may comprise information about what type of control should be created ("ControlModel") and/or a link to additional parameters ("ControlParameter"). As will be described in greater detail below with respect to FIG. 8, the rules engine module 280 may use this data to create virtual control objects (VCOs). A VCO may be an object that represents a visual or not screen element and implements its interaction with the host through the RDE interface. In addition, the VCO may hold host based data content used to visualize and place a corresponding control element on the screen (such as visual attributes, text, action data, etc.). The VCOs may be created and filled with data by the identification engine. The identification engine may be part of the modernization engine. It may allow a unique identity to be given to each screen so that controls may be linked to individual screens and/or to apply rules to individual screens. The VCOs may be passed by the VSL module 270. The VSL module 270 may add a screen interaction to each VCO and pass the VCO to the presentation layer module 400 on a new screen event. A VCO may expose two interfaces to the presentation layer 410, the VCO interface through which access to the interaction screen object is possible and the VCO data interface. Data in the VCO may comprise the following:

1. Control Model—Identifies what type of control should be placed. For example, the type may be a standalone VCO such as Email, StaticText, EditableText, etc., or a container or place holder type that may comprise one or more VCO entities.

2. ControlData (properties of controls)—a collection of string/object pairs that hold control data supplied by the Rules Engine. Array of visual attributes (Color, underscore, blink and reverse video) may be added as object to the ControlData collection in form of "VisualAttrbutes, VisualAttributes key/value pair, for example. Similarly, for action data, key/value pairs for action data information (IE "pfkey", "1" or "email_address", "John.doe@gmail.com") may be provided.

3. CustomControlData key/value pairs from rule's XML, where values may be simple strings 4. Locations—Array of screen locations (can be part of the Control Data)

5. Texts—Array of texts according to the locations (can be part of the ControlData)

6. Children—An option to pass complex types such as table and menu in hierarchical form. In the first stage VCOs may be passed to the VSL as non hierarchical elements. For example, a table passed as a VCO of type table (Table VCO) may have two children VCOs, a table header VCO and table body VCO. The table header VCO may have, for example, 3 children (3 VCOs of type static text for 3 table columns). The table body VCO may have, for example, 24 children (8 VCOs of type editable text and 16 of static text).

7. Screen interaction object—For example, a screen interaction object may implement the following interface:
   a. KeyDown(int innerOffset, KeyEventArg arg)
   b. KeyUp(int innerOffset, KeyEventArg arg)
   c. CursorPosition(int innerOffset)
   d. TextChanged(string newText)
   e. CursorChangedEvent
   f. TextChangedEvent The RDE (Rumba Developer Edition) module 290 may comprise a set of APIs that may allow a script to interact with the system 110, and such modules may be known to those of ordinary skill in the art.

The presentation layer module 400 may create and/or place modern UI controls on the screen. This may be done by creating a presentation layer 410 for each mainframe 120 access session. FIG. 4 illustrates a presentation layer module 400, according to an embodiment of the invention. Presentation layers 410 created by the presentation layer module 400 may define the layout and appearance of the screen. Presentation layers 410 may be available in various forms, for example a "Modern UI" (full replacement GUI) and/or a "Layered UI" (floating controls over a standard green screen layout). Each presentation layer 410 may contain a screen control object and corresponding UI controls 411, 412, 413. Presentation layers 410 may be associated with base presentation layers 420, which may be responsible for UI control creation for the associated presentation layer 410. As described in greater detail below with respect to FIG. 7, on a new screen event from the virtual screen layout 270, the base presentation layer 420 of the presentation layer module 400 may receive a list of virtual control objects (VCOs), cause a control factory to generate presentation control objects (PCOs), and load the controls using the PCOs and a reference to the VCOs. The control factory may be a module that may merge the identified control type that comes from the rules engine and the control repository to create a unique instance of this control with correct properties. For example, a rule may place a calendar on a specific field, and this calendar may have some specific properties. The control factory may instantiate a calendar with the correct date format. On a new screen event, previous controls may be deleted and new PCOs may be made. UI controls may be cached for reuse in the future.

Figure 5A:
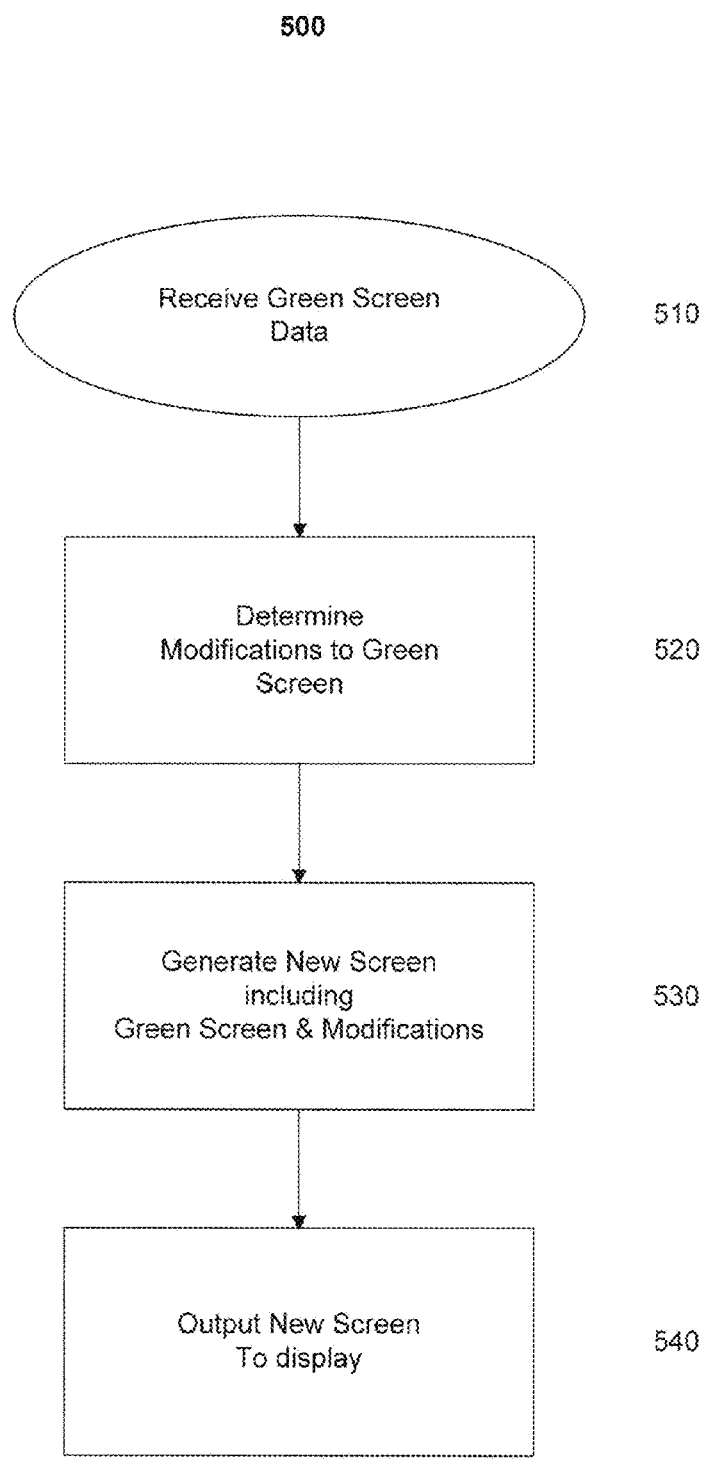
FIG. 5A is an interface generating method according to an embodiment of the invention.

FIG. 5A is an interface generating method 500 according to an embodiment of the invention. This method may be performed by the system 110 components described above, for example, to generate a screen. In 510, the system 110 may receive green screen data, which may be from a host 120, for example. In 520, the system 110 may determine modifications to be made to the green screen, such as added and/or enhanced UI controls. In 530, the system 110 may generate a new screen, which may comprise the green screen data and modifications, for example using WPF and HTML 5 technologies. In 540, the system 110 may output the new screen to a display. In some examples, the new screen may be displayed directly into an associated program window (using .Net technologies), to an iPad, or in HTML. For example, the new screen may be sent to a monitor or touch screen of the system 110 or a client 140, The screen may also be embedded in a web page which may be sent from the system 110 to the client 140 via the network 130, in another example.

Figure 5B:
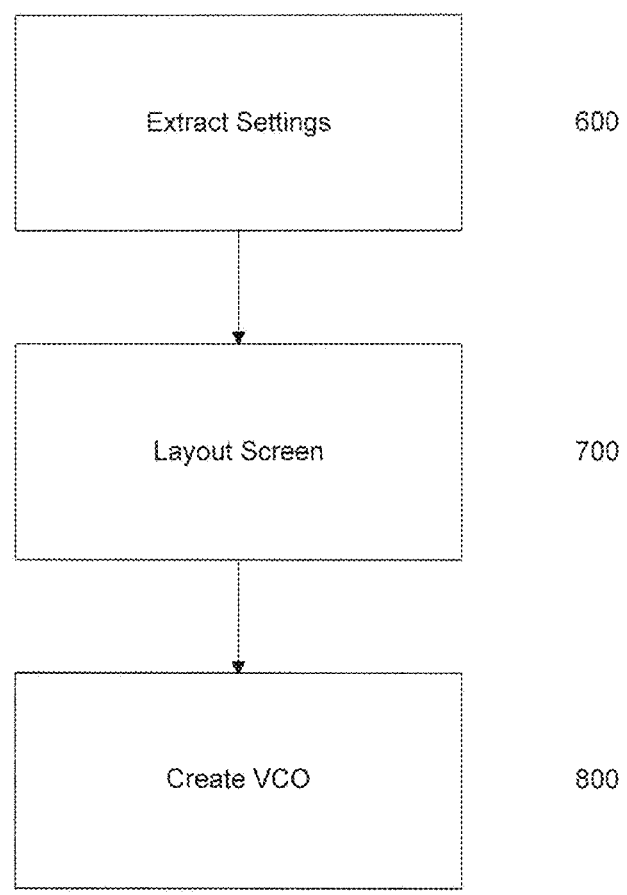
FIG. 5B is a modification determining method according to an embodiment of the invention.
Figure 6:
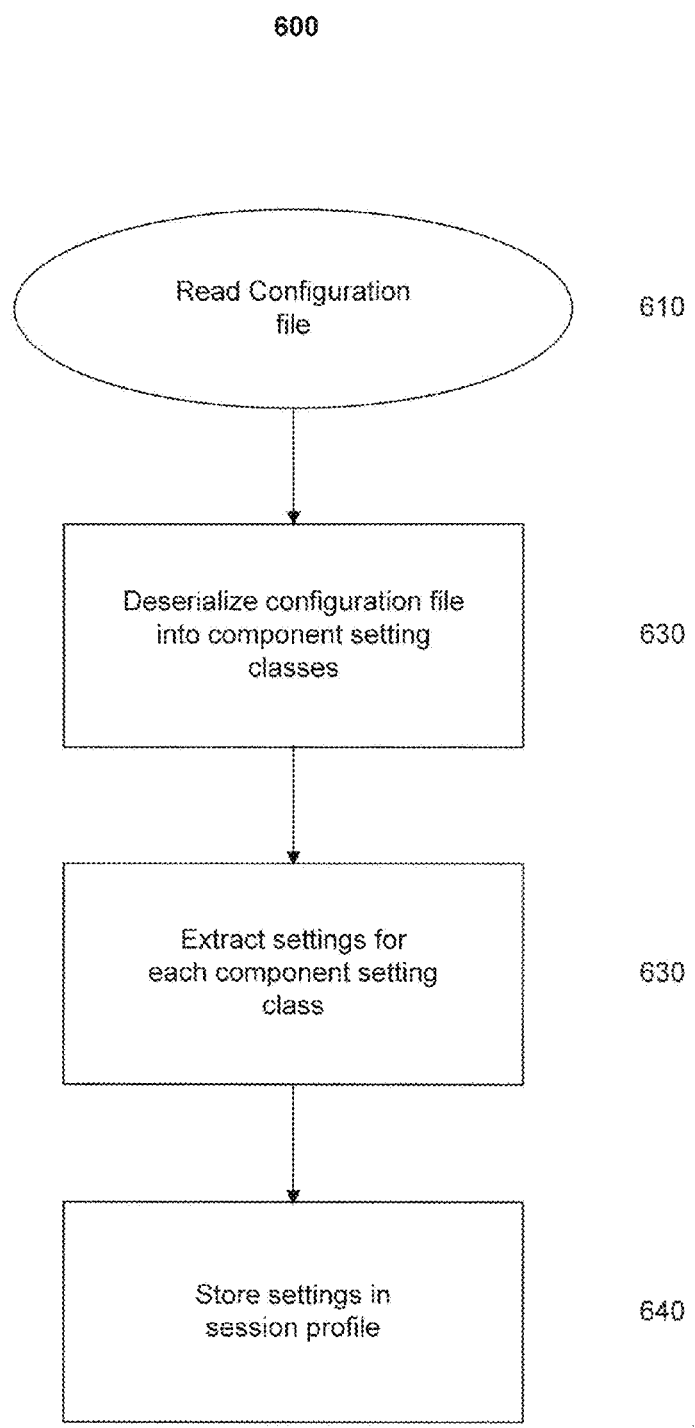
FIG. 6 is a settings extraction method according to an embodiment of the invention.
Figure 7:
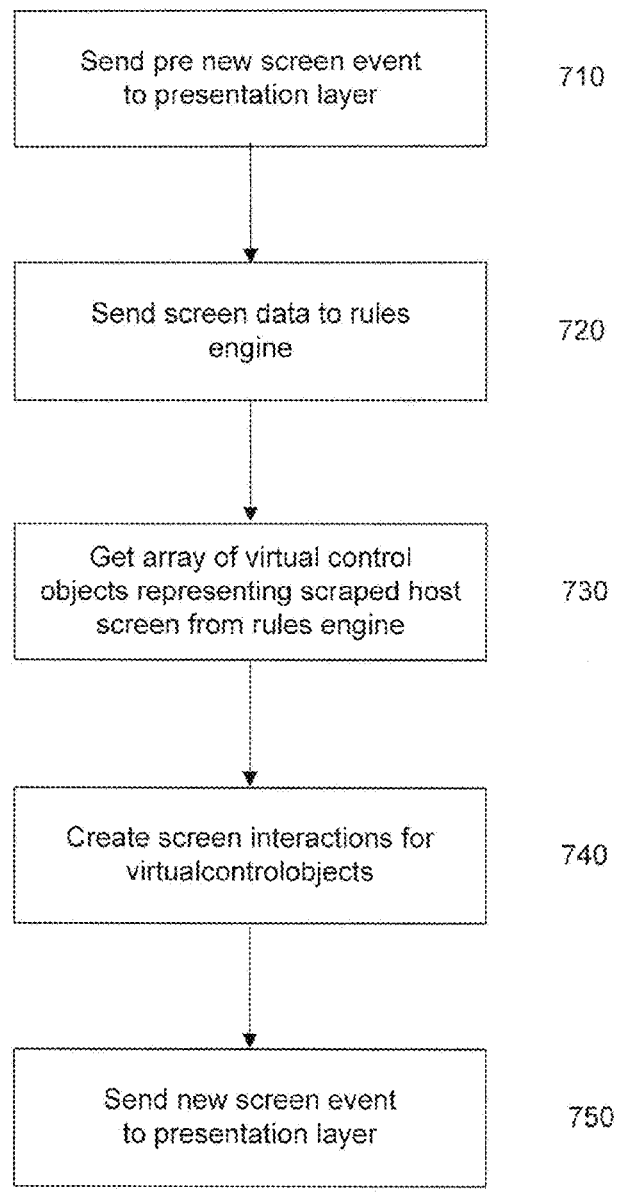
FIG. 7 is a screen layout method according to an embodiment of the invention.
Figure 8:
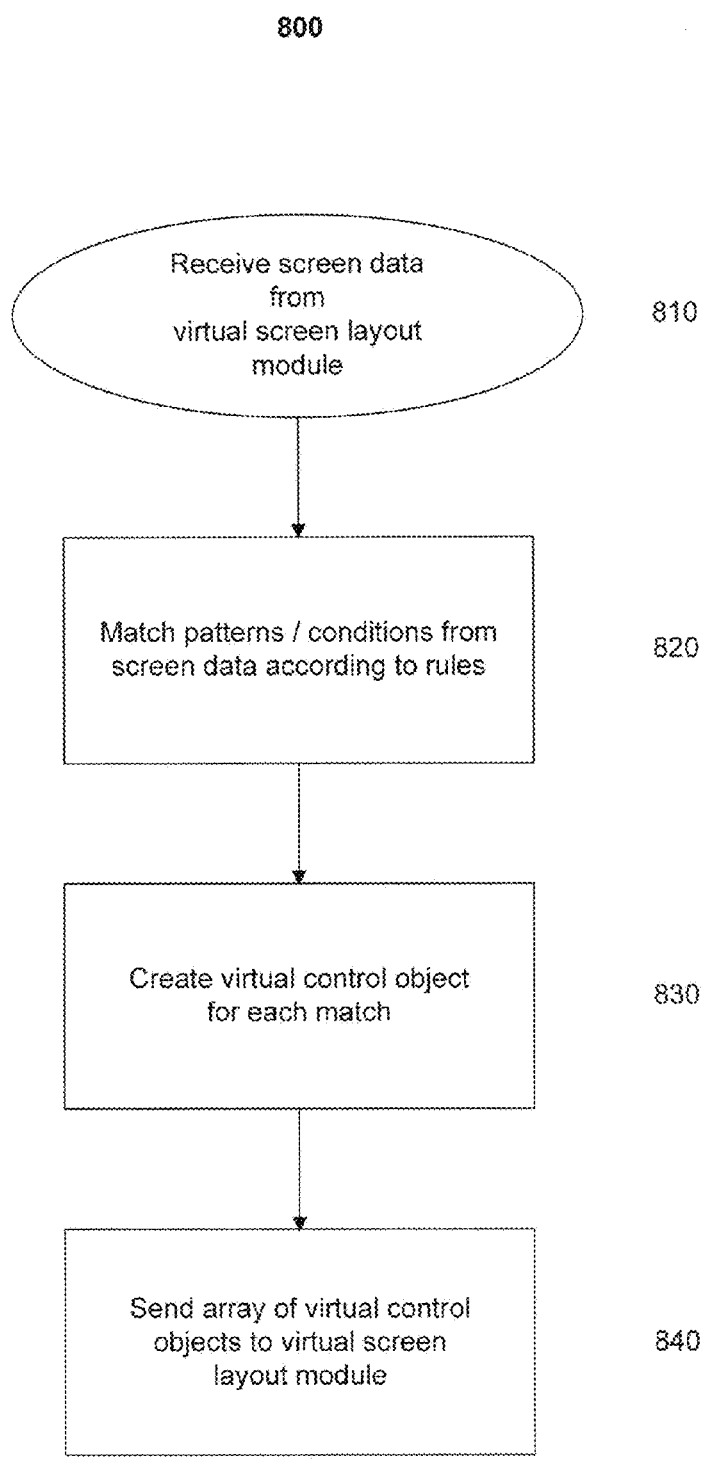
FIG. 8 is a virtual control object creation method according to an embodiment of the invention.

FIG. 5B is a modification determining method 520 according to an embodiment of the invention. The system 110 may determine modifications to the green screen based on the received green screen data by extracting settings from the configuration files for the green screen modifications 600, laying out a modified screen 700, and creating virtual control objects for the screen 800. FIGS. 6-8 provide details about how the system 110 may perform this method 520 in some embodiments.

FIG. 6 is a settings extraction method 600 according to an embodiment of the invention. As part of a process to receive and/or determine modifications to a green screen as described above in FIG. 5A, the settings module 240 may extract settings which may be used in making the modifications. In 610, the settings module 240 may receive a master configuration file 310 associated with the present mainframe 120 and/or session. In 620, the settings module 240 may deserialize the master configuration file 310 into component setting classes. In some embodiments, each control may have its own configuration. Deserializing the master configuration file may output several component setting classes (for example: LayeredUISetting, ControlFactorySetting, RuleEngineSetting). Each component setting class may hold its known configuration settings in their actual types (Boolean, int . . . ) and not in an xml format. In 630, the settings module 240 may extract these settings, and in 640, the settings module 240 may store these settings in a session object, which may be in a database or other memory on the UI system 110, the client 140, or elsewhere, or any combination thereof. The configurations may be per session and may be stored inside the session object as a link to an XML file. Thus, screen components may receive relevant objects in their initialize phase and can get their settings from the objects. If settings are updated, for example in response to user input or system configuration changes, the settings module 240 may detect the update and determine an amount of changes being done to the settings. In the case of minor changes, the settings module 240 may raise a "SettingChange" event. If major changes are to be made, the settings module 240 may raise a "Refresh Screen Event", which the "Virtual Screen Layout" may cache. The settings module 240 may make this decision through an event programming mode. Some controls may have only 2 states: activated or not; some others may have much more complex states and may even have events like "updated", "on focus", "lost focus", etc. More complex states may require more complex changes.

FIG. 7 is a screen layout method 700 according to an embodiment of the invention. The RDE 290 may input host screen data (e.g., data about the green screen of the mainframe 120). The virtual screen layout (VSL) module 270 may send the host data and host interaction information to the presentation layer module 400. The host data and host interaction information may comprise the screen data from the RDE 290 and/or data from the rules engine 280. The data may be sent to the presentation layer module 400 on a new host screen event. For example, a host screen event may be raised when a session begins and/or when a change occurs in the green screen e. For example, this inputting may proceed as follows. In 710, in some embodiments and/or sessions, the VSL module 270 may send a pre new screen event to the presentation layer module 400. The pre-new screen event may be raised just before the new screen arrives. It may allow the system 110 to clean and prepare itself for the next screen. In 720, the VSL module 270 may send the screen data from the RDE 290 to the rules engine 280. As described below in the context of FIG. 8, the rules engine 280 may generate virtual control objects representing the scraped host screen. In 730, the VSL module 270 may receive these objects. In 740, the VSL module 270 may create UI controls and/or screen interactions for VCOs if necessary. The VSL module 270 may also implement VCO grouping by agreed criteria between the VSL module 270 and presentation layer 410, such as by location. In 750, the VSL module 270 may send the new screen event to the presentation layer module 400, which may comprise passing the array of VCOs to the presentation layer module 400.

FIG. 8 is a virtual control object creation method 800 according to an embodiment of the invention. In 810, the rules engine module 280 may get screen data from the VSL module 270. In 820, the rules engine module 280 may match patterns and conditions according to the rules that are enabled in the rule settings. In 830, the rules engine module 280 may create a VCO for each match between the received screen data and the patterns and conditions. In 840, the rules engine module may return VCO controls to the VSL module 270. The VCOs that may be returned to the VSL module 270 may comprise the entire host data needed for the UI controls construction except the interaction logic, which may be added by the VSL module 270.

For example, green screen data may comprise a date displayed in a known date format (e.g., MM/DD/YYYY, DD/MM/YYYY, Month/Day/Year, or others). A rule may comprise information identifying data presented in these formats as a date. Upon matching green screen information in a date format to the rule, the system 110 may create a VCO calendar. Specifically, in this example, the system 110 may create a calendar object. Therefore, the output screen based on the green screen data may comprise a calendar (which may be in a daily, weekly, monthly, yearly, or other format) with the identified date from the green screen data highlighted.

In another example, green screen data may comprise an address displayed in a known address format (e.g. street address/city/state/zip/country or others). A rule may comprise information identifying data presented in these formats as an address. Upon matching green screen information in an address format to the rule, the system 110 may create a VCO. Specifically, in this example, the system 110 may create a map object. Therefore, the output screen based on the green screen data may comprise a map (which may be an interactive map and/or may be generated using an external map program such as Google Maps or Mapquest or the like) with the identified address from the green screen data highlighted and/or with the map centered on the identified address.

In another example, green screen data may comprise a number preceded or followed by a currency symbol, which may indicate a monetary value. A rule may comprise information identifying data presented in these formats as a monetary value or cost item. Upon matching green screen information in a monetary format to the rule, the system 110 may create a VCO. Specifically, in this example, the system 110 may collect this data and incorporate it into a budget spreadsheet, chart, or the like. Therefore, the output screen based on the green screen data may comprise billing or budget data based on the green screen information.

Figure 17:
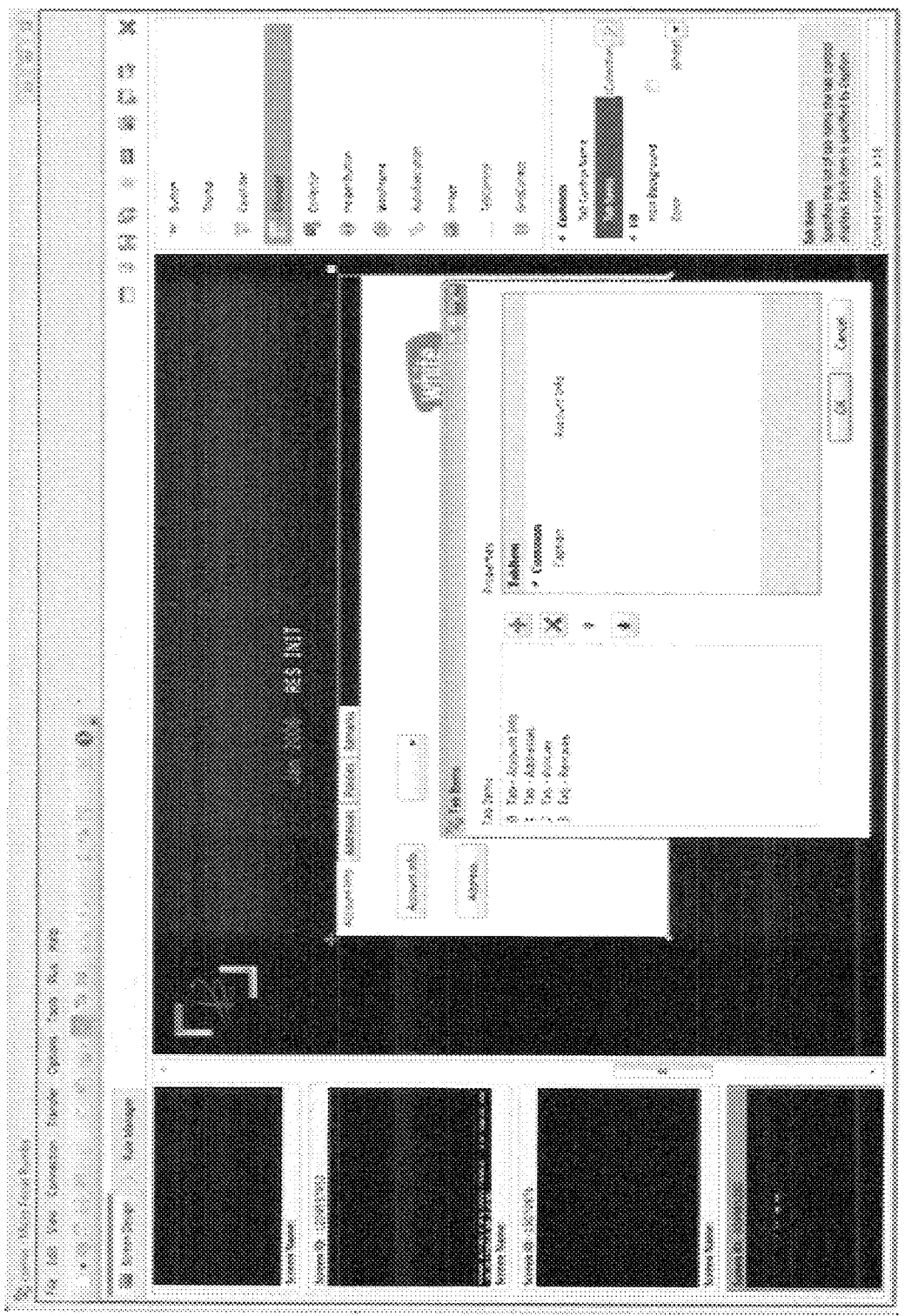
FIG. 17 is a screenshot of the design time of a multi-tab control according to an embodiment of the invention.
Figure 18:
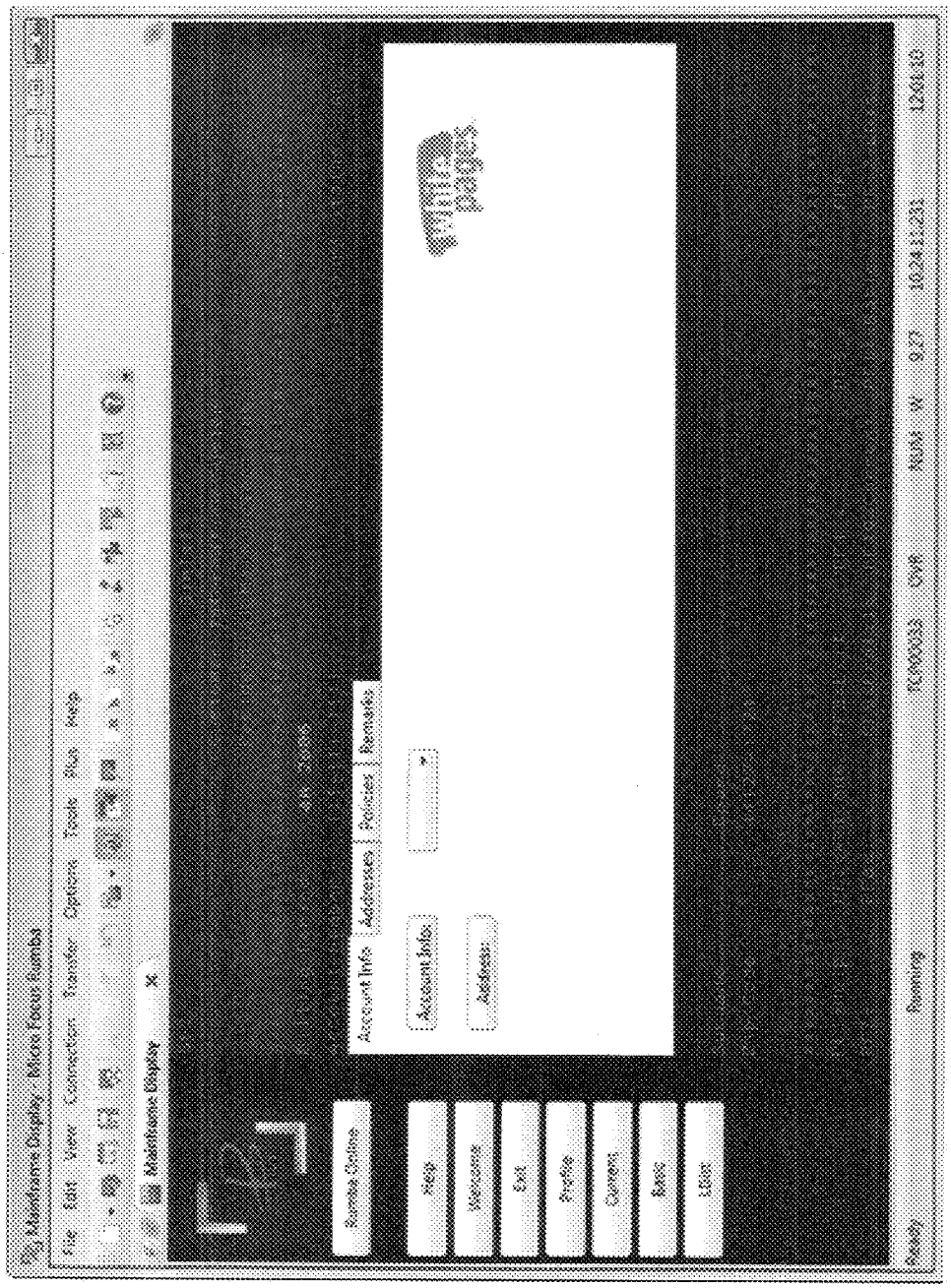
FIG. 18 is a screenshot of a multi-tab control over a green screen according to an embodiment of the invention.

Controls may be UI control elements and may implement a base control interface. Each control may supply its own repository which may be used to deserialize control configuration files (e.g., 320, 330, 340) from the master configuration file 310 (i.e., control properties may be retrieved from a repository). Example controls may comprise the following, and other controls may be possible as well:

1. Helper (Button)
2. Auto completion Control
3. Tooltip
4. Spellchecker
5. Hyperlink
6. Context menu
7. Collect Control—control that collects data in the screen
8. Edit box
9. Label
10. Calendar
11. Chooser (ComboBox, Dropdown Box).
12. Radio button control. The Radio button control may be used to make a choice between several options and insert a text in the screen related to the chosen option.
13. Checkbox control. The CheckBox control may act as an on/off toggle control in the same way as a typical check box. The CheckBox option provides the user a method of choosing between two options, such as Yes and No.
14. Image control The image control may be used to display an image or a colored rectangle on an area on the screen. The colored rectangle may be used to mask a part of the screen. An example use of the image is to display a picture of a product, a chart or a photo.
15. Webframe control. The Web Frame may be an icon which, when clicked, opens a separate window in the default Web browser at a specified Web address. For example, an icon looking like a small globe can be set to open a map based on the postal address displayed in the host screen field.
16. ModernScreenControl (A modern UI representation of a green screen field. This control may comprise either input control or static text and other OSA (On Screen Assist or embedded controls) controls. Controls built from the VirtualControlObject and belonging to the same field on the green screen may be added to the same ModernScreenControl instance. There may only be one "main" control per field. All OSA (On Screen Assist or embedded controls) controls may be shown and hidden according to keyboard/mouse events).
17. Multi-tab control: This control may enable the ability to present a collection of tabs and to include a collection of any type of controls into each of the tabs. FIG. 17 illustrates an example screenshot of the design time of a multi-tab control. The screen designer of FIG. 17 may allow a user (e.g., such as an administrator) to drag and drop a multi-tab control over a screen area. This control may be created as well with the rule wizard (e.g., non WYSIWYG tool). The chosen area may be covered by the multi-tab control and nothing from it will be visible. The user (e.g., such as an administrator) may choose to add several tabs to the multi-tab control and to add several controls to each of the tabs. FIG. 18 illustrates an example screenshot of a multi-tab control over a green screen, for example, as set up by an administrator using FIG. 17. This multi-tab control may appear over a screen area that may be defined into the screen designer. It may completely override the screen content of this screen area and present modern controls instead. When clicking on the tab title, the selected tab change and the presented controls may change accordingly.

18. Mail control: This control may enable the ability to send formatted mail based on collector controls.

19. Chart control: This control may enable the ability to create a visual representation of the screen data (pie chart, bar chart . . . ).

Figure 19:
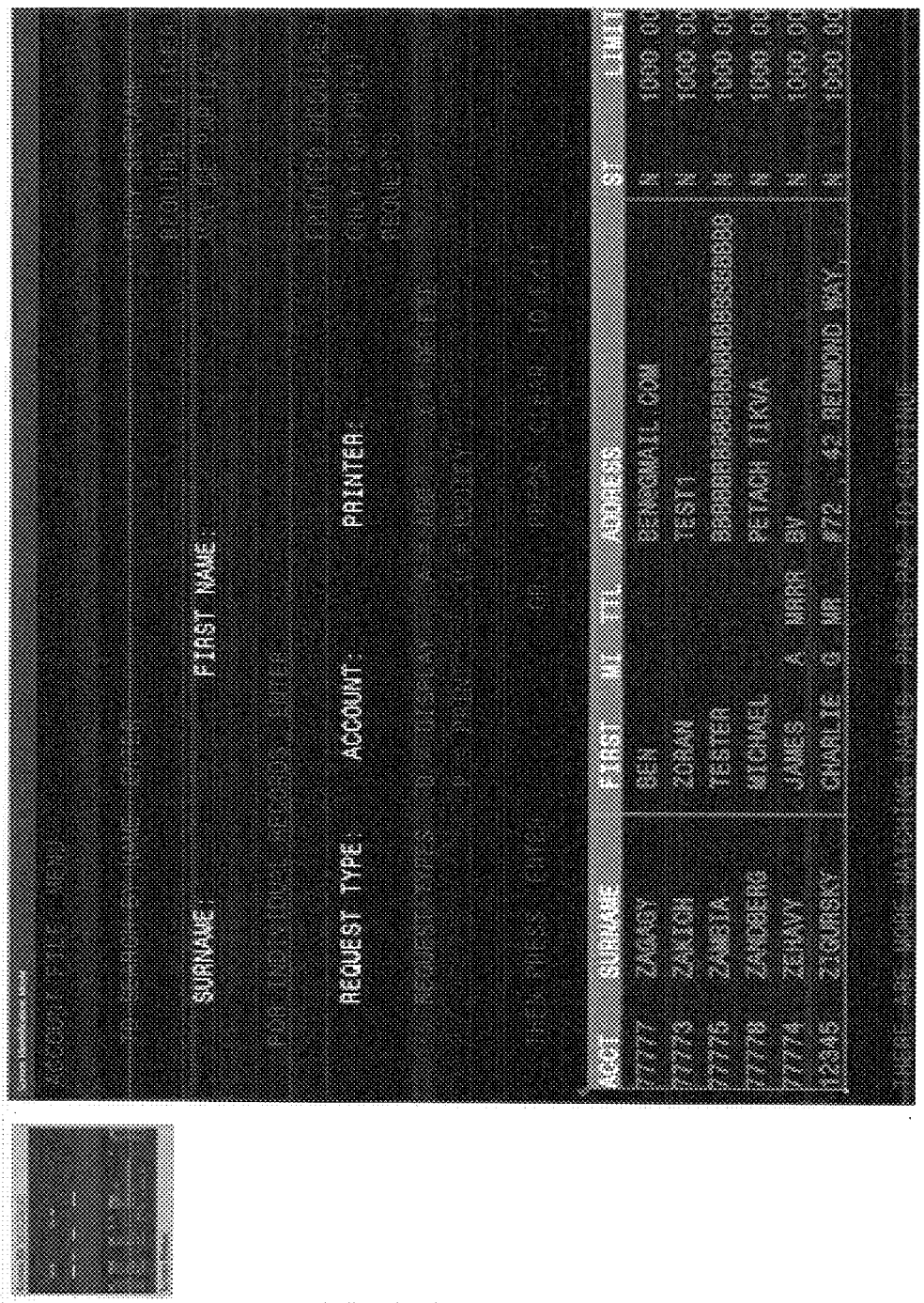
FIG. 19 is a screenshot of a table control according to an embodiment of the invention.

20. Auto-exec control: This control may enable the ability to run automatically a collection of actions locally or against the host when a new green screen arrives 21. Table control: The control may enable the ability to merge several screens containing a list into a single control. FIG. 19 illustrates an example screenshot of a table control. This table control may be covering a screen area (in this example, the one that was used for the list content). It may display some columns of the original list (e.g., some can be hidden, some can be wider, smaller). Rows may be aggregated from several green screens to be presented in a single table. It may save the user the time of navigating into these screens and it may leverage the sorting feature of the column and the filtering feature of the rows. The user may save time and gain productivity.

Note that in some embodiments, a user may be able to create custom controls.

FIG. 9 is an interface generating system 1500 according to an embodiment of the invention. As discussed above, the UI system 110 may receive green screen data 1570. This green screen data 1570 may be directly viewable as a green screen 1530. However, the UI system 110 may use the green screen data 1570 to generate new screens. For example, a desktop screen 1540, which may be viewable via a display directly attached to the UI system 110 in some embodiments, may be generated according to the processes described above. Also, a mobile screen 1550 and/or a web screen 1560 may be generated according to the processes described above, and these screens 1550, 1560 may be viewable on remote clients 140 in some embodiments. The screen designer 1510 may be a module in communication with the system 110 which may allow a user to generate customized screen settings. For example, through the use of a GUI, a user may create and/or edit rules and settings for generating new screens. The rules and settings may be implemented by the system 110 as described above. FIGS. 10-17 below are some example screenshots of screens 1530-1560 and screen generation interfaces.

FIG. 10 is a green screen 1600 according to an embodiment of the invention. This screen 1600 may be an example of a green screen 1540 which has not been modified by the UI system 110.

Figure 11:
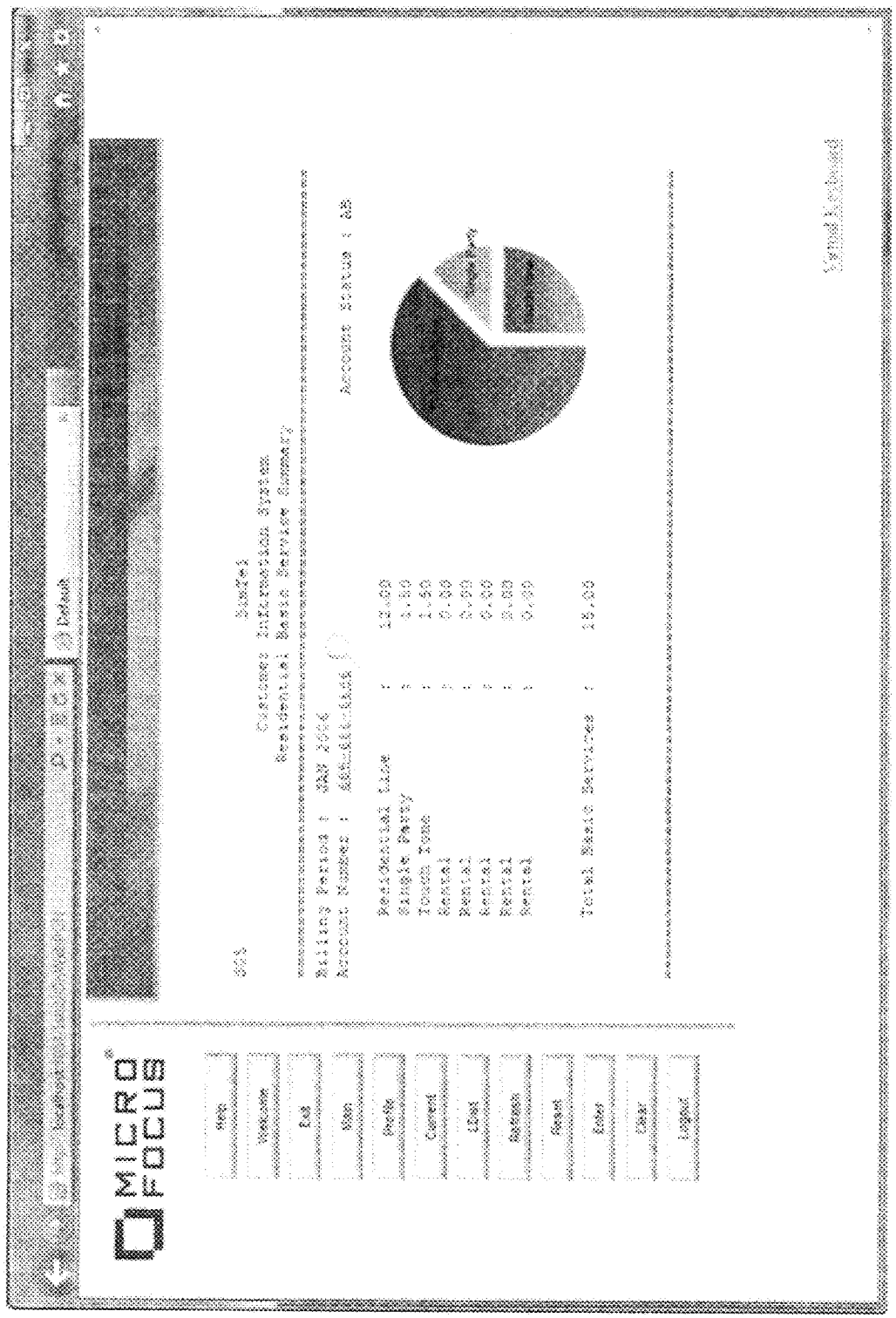
FIG. 11 is a green screen according to an embodiment of the invention.

FIG. 11 is a green screen 1700 according to an embodiment of the invention. This screen 1700 may be an example of a desktop screen 1540. In this example, the green screen data has been incorporated into a new display which includes a pie chart and a billing summary. This information may have been extracted from the green screen and formatted into a modern windowed display as described above. A user may be able to select options via this interface with a mouse or keyboard shortcut, for example, which may have been less directly accessible or unavailable altogether in the green screen on which this example screen 1700 is based.

Figure 12:
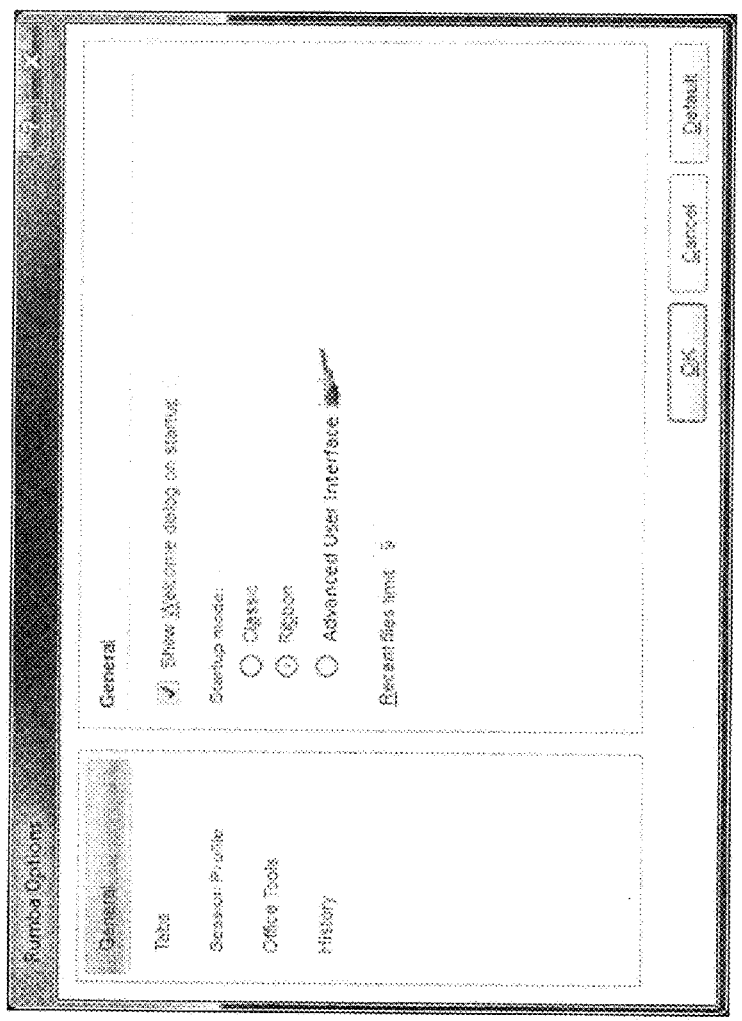
FIG. 12 is an options screen according to an embodiment of the invention.

FIG. 12 is an options screen 1800 according to an embodiment of the invention. A user may be able to toggle between viewing a green screen 1530 and a modified screen (e.g., desktop screen 1540) using a GUI 1800. In this example, multiple desktop screen 1540 presentation options (classic, ribbon, advanced user interface) are provided. Each option may present a screen 1540 with different UI elements and/or appearances. In some embodiments, different modes may be toggled without requiring a computer restart. Users may be presented with other options, for example:

1. End-User can toggle between modern and traditional screens
2. End-User can mark a toggled screen as "always treat as green screen"
3. End-User might be allowed to change font & font pixel reduction
4. End-User can be allowed to dismiss a helper control (such as a date picker) so it will not appear again at that specific field-screen or region combination.
5. Default list of screens to present as green (traditional) and toggle automatically
6. Containing XAML design (Logo etc.)
7. Default colors, fonts, font sizes (points reduction)

Figure 13:
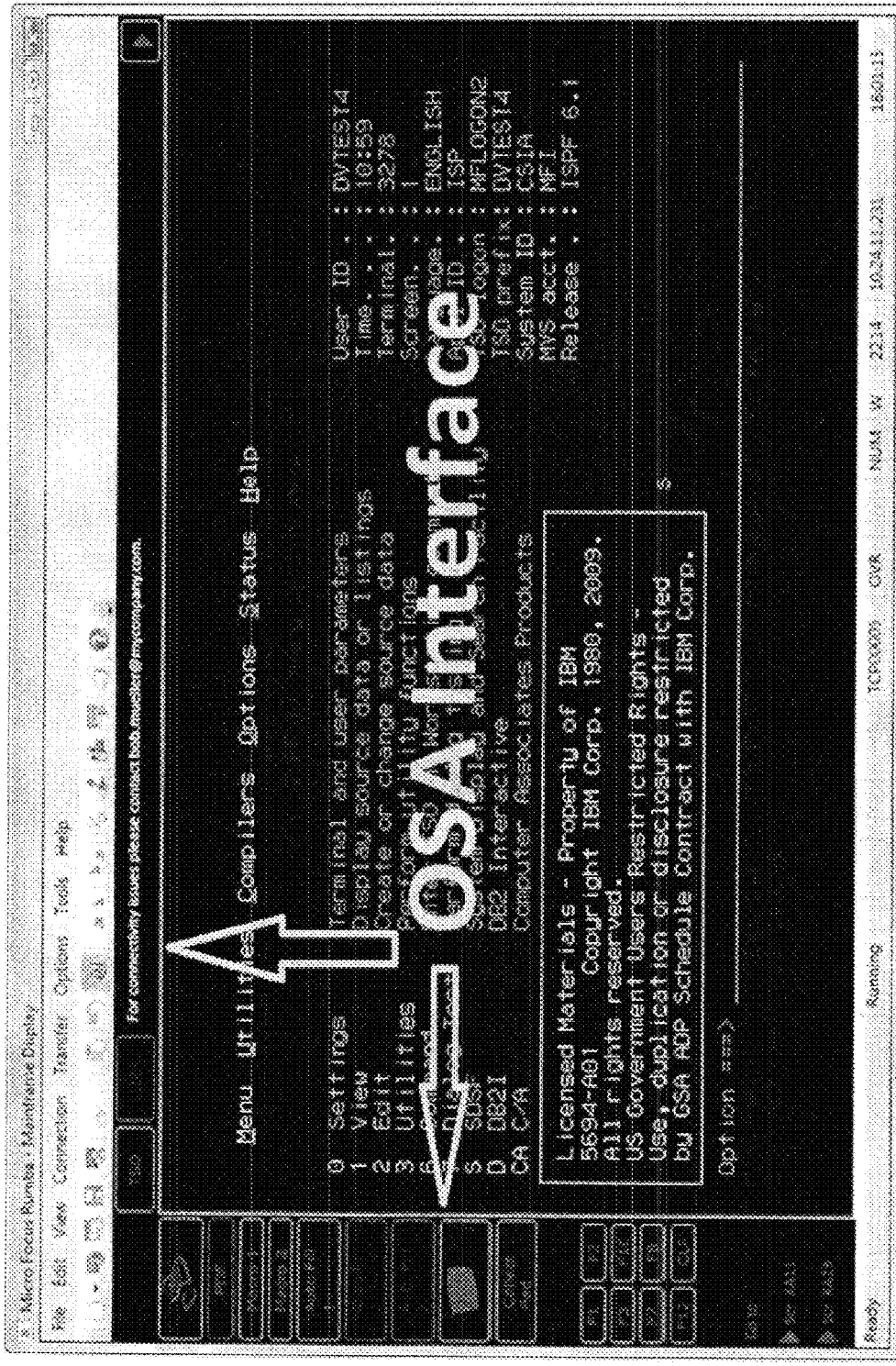
FIG. 13 is a green screen according to an embodiment of the invention.

FIG. 13 is a green screen 2000 according to an embodiment of the invention. In this embodiment, the example screen 2000 is a desktop screen 1540 which has modified a green screen 1530 with an OSA (on screen assist) interface or "productivity layer" interface. This interface may add UI features in a non-intrusive way to the green screen. OSA user interface may be a combination of two toolbar controls, surrounding the green screen display, that may show/hide actions while a user navigates through screens. Some example OSA UI features may comprise the following:

Screen/filed helper—A button that can open a textual dialog help, or notes the user entered for the presented application screen. Hovering over fields may present a help string on OSA UI Macro/Script buttons—buttons may appear when the associated screen appears during navigation Execute buttons—may run external applications or RDE code provided through add-ons Auto Fill—can fill in fields with pre-configured values Send mail—can show button when mail address appears on the green screen Function keypad—recognized application function keys (and some static keys) may be presented Static OSA components—pre-configured toolbar components and OSA control components such as show/hide and configuration buttons As those of ordinary skill in the art will appreciate, any tools or features may be made available in the interface. Helper, auto completion control, tooltip, spellchecker, hyperlink, context menu, controls for collecting data in the screen, edit box, label, calendar, chooser, and modern screen controls are additional possible examples of OSA features. Other features may also be provided. Specific implementation examples may comprise the following:

1. Recognizing an email address notation and replacement with a hyperlink that invokes an email application—outlook addressed to the specific email address.
2. Recognizing a combination of a protected field that comprises the text "Date" followed by an unprotected field—and attaching a small widget for date-entry assistance ("date Picker control").
3. Providing the Hot-Spots functionality as buttons, hyperlinks and menu entries.
4. Combo-Box (drop down) replacement of entry fields.
5. Tooltips support
6. Spell Checking support
7. Look & feel customization of the automatically generated UI, for example through the addition of a company logo, styles directive to apply to the generated modern controls, text, advanced additions and controls supported by XAML, or any combination thereof.

Figure 14:
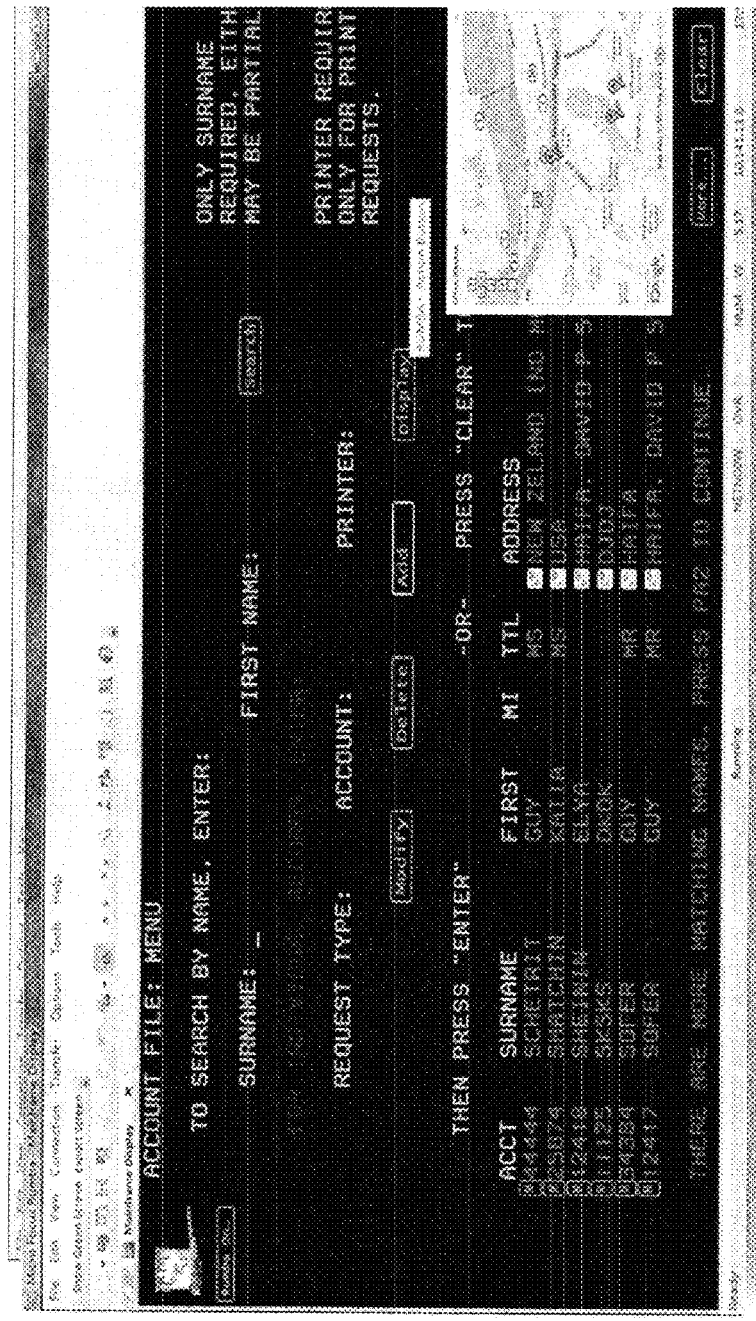
FIG. 14 is a green screen according to an embodiment of the invention.

FIG. 14 is a green screen 2100 according to an embodiment of the invention. This screen 2100 may be an example of a desktop screen 1540. Note that a map has been overlaid on the green screen in this example. A user may be able to select a address from the green screen data and a graphical map (which may be supplied by a web service or other program) may be presented showing the location of that address, for example.

Figure 15:
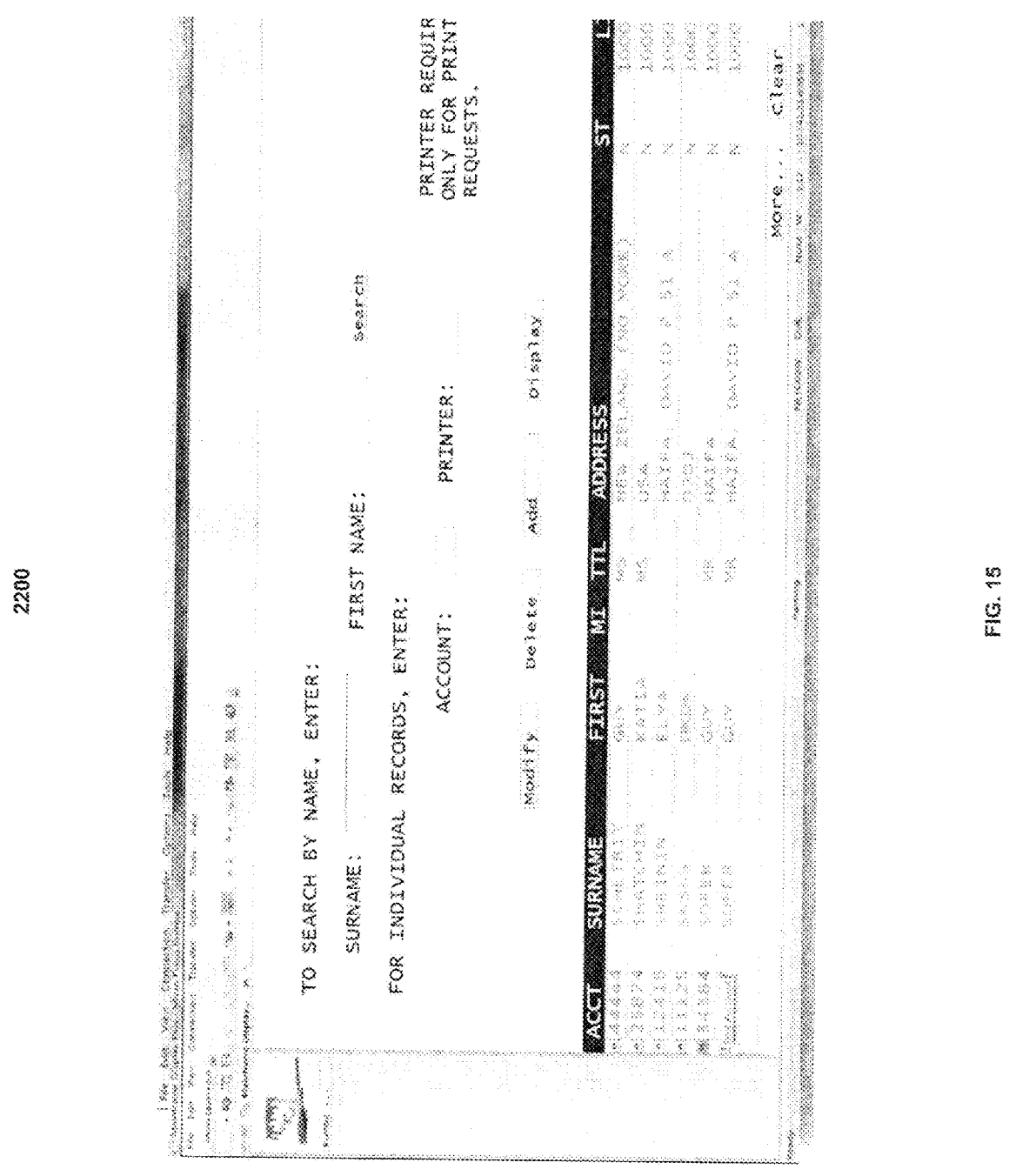

FIG. 15 is a green screen 2200 according to an embodiment of the invention. This screen 2200 may be an example of a desktop screen 1540. This example illustrates that a modern user interface, which may resemble user interfaces commonly found in modern operating systems such as Windows and Mac OS, modern web browsers, other familiar programs, or combinations thereof.

Figure 16:
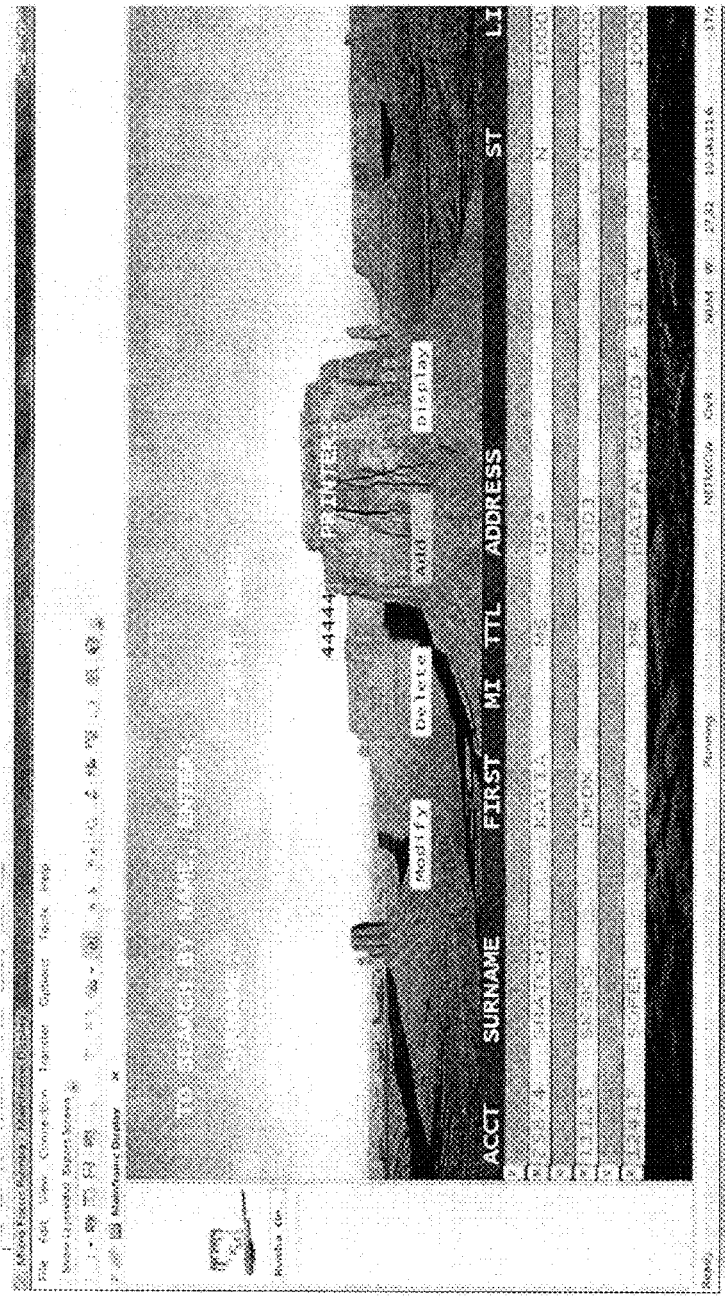
FIG. 16 is a green screen according to an embodiment of the invention.

FIG. 16 is a green screen 2300 according to an embodiment of the invention. This screen 2300 may be an example of a desktop screen 1540. This example illustrates a modern user interface similar to that of FIG. 15 with further graphical enhancements and changes. Those of ordinary skill in the art will appreciate that additional and/or different UI changes may be made without deviating from the scope of the systems and methods described herein.

Some examples of additions or modifications to a green screen enabled by the systems and methods described herein may comprise spell checker support, covering English, French, German, Spanish, and or other languages, custom dictionaries, IPV6 support, Citrix and APP-V support, nTrace based mechanisms for support incidents handling, hyperlinks detection support (for example allowing automatic detection of URI/URL forms and transforming them to active hyperlinks, which may comprise file and mailto URIs), maximize and restore individual tiled session tabs, improved startup time, ability to develop RDE .NET applications using Web-To-host, VT extended color support, remembering desktop size and position between invocations, support for multiple-physical displays, automatic transformation to modern user interface under windows, full emulation functionality backwards compatibility, dynamic helper controls mechanism, date picker entry control, drop-down selection box (Combobox), action button positioning capabilities, tooltips, template based layout management using standards, themes/skins selection and customization support, dual mode operations, on screen productivity framework (layered UI), advanced user interface mode (modern UI), function/AID keys to sidebar buttons transformation ('hotspots'), basic adjustments on screen (e.g., dismiss a misplaced helper control at a specific screen), other changes or additions, or any combination thereof.

Previous green screen modernization solutions may be based on a server that connects to a host, receives a screen, applies a template to transform it in HTML, and then sends it to an Internet browser. Current solutions may be based on http 1.1 which requires establishing a connection between the Internet browser and the server at each request and force the client to only be able to pull data from the server. To build these transformations, the developer has to code it using a language like Java, Javascript, HTML, or an older language such as Rexx or Python.

In embodiments of the invention, improvements may be made at all stages of the modernization process. At the development phase, no coding is required. All modernization rules may be created through wizards and don't require coding skills at all.

With respect to the server, it may use last web technologies that allow quicker connection and may give the server the ability to push data to the client and therefore improve the reactivity of the application and offer a better user experience than former solutions.

Actual Internet browsers may include strong, robust and efficient javascript engines. Unlike former modernization solutions, embodiments of the invention may leverage these engines by delegating all HTML creation to the client instead of doing it server side. This may allow saving a lot of server CPU and therefore may improve the load being handled by a single server.

Another embodiment may include the merging of the green screen data to present a consolidated view.

Another embodiment may include utilizing web socket technology to maintain live connection between a server and a clients, or to have asynchronous communication between the server and the client, or both.

Another embodiment may include utilizing an intermediate server to access host screens.

Another embodiment may include the intermediary server acting as a proxy to isolate the host from the client for security and/or technical reasons.

Another embodiment may include the user interface control comprising: a helper button control, an auto completion control, a tooltip control, a hyperlink control, a collect control, an edit box control, a label control, a calendar control, a dropdown list control, a modern screen control, a multi-tab control, a mail control, a chart control, an auto-exec control, a radio button control, a checkbox control, an image control, a webframe control, or a table control, or any combination thereof.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than that shown.

Further, the purpose of any Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. An Abstract of the Disclosure is not intended to be limiting as to the scope of the present invention in any way.

Although the term "at least one" may often be used in the specification, claims and drawings, the terms "a", "an", "the", "said", etc. also signify "at least one" or "the at least one" in the specification, claims and drawings.

Additionally, the term "comprising" or similar terms in the specification, claims and drawings should be interpreted as meaning "including, but not limited to."

Finally, it is the applicant's intent that only claims that include the express language "means for" or "step for" be interpreted under 35 U.S.C. 212, paragraph 6. Claims that do not expressly include the phrase "means for" or "step for" are not to be interpreted under 35 U.S.C. 212, paragraph 6.

What is claimed is:

1. A method comprising:
performing processing associated with receiving, with an interface generating module in communication with a processor and a database, green screen data;
performing processing associated with receiving and/or determining, with the interface generating module, a modification to be applied to the green screen data;
performing processing associated with generating, with the interface generating module, a user interface screen including the green screen data and the modification; and
performing processing associated with causing, with the interface generating module, the user interface screen to be displayed on a display,
wherein the performing processing associated with receiving, with the interface generating module, the green screen data comprises receiving the green screen data via a direct connection with a mainframe,
wherein the performing processing associated with generating, with the interface generating module, the user interface screen including the green screen data and the modification comprises:
performing processing associated with sending, with a virtual screen layout module associated with the interface generating module, the green screen data to a rules engine module associated with the interface generating module;
performing processing associated with receiving, with the virtual screen layout module, a virtual control object from the rules engine module, the virtual control object comprising scraped green screen data and being associated with a visual element of the user interface screen;
performing processing associated with creating, with the virtual screen layout module, a screen interaction for the virtual control object; and
performing processing associated with sending, with the virtual screen layout module, a new screen event including the screen interaction to a presentation layer module associated with the interface generating module,
wherein the performing processing associated with generating, with the interface generating module, the user interface screen including the green screen data and the modification further comprises:
performing processing associated with receiving, with the rules engine module, the green screen data;
performing processing associated with comparing, with the roles engine module, the green, screen data to a rule to determine whether a match between green screen data and the rule exists;
when the match exists, performing processing associated with generating, with the rules engine module, the virtual control object associated with the match; and
performing processing associated with sending, with the rules engine module, the virtual control object to the virtual screen layout module,
wherein the performing processing associated with generating, with the rules engine module, the virtual control object associated with the match comprises:
performing processing associated with creating with the rules engine module, a virtual control object of a type associated with the rule and
performing processing associated with incorporating, with the rules engine module, the identified data associated with the information type into the virtual control object.

2. The method of claim 1, wherein the performing processing associated with receiving, with the interface generating module, the green screen dam comprises receiving the green screen data via a network.

3. The method of claim 1, wherein the performing processing associated with receiving and/or determining, with the interface generating module, the modification to be applied to the green screen data comprises:
reading, with a setting module associated with the interface generating module, configuration information;
determining, with the setting module, a component setting class from the configuration information;
extracting, with the setting module, a setting for the component setting class, wherein the setting is the modification; and
storing, with the setting module, the setting in a session profile in the database.

4. The method of claim 1, wherein the performing processing associated with receiving and/or determining, with the interface generating module, the modification to be applied to the green screen data comprises receiving a modification from a user input made via a user interface in communication with the processor.

5. The method of claim 1, further comprising:
performing processing associated with receiving, with a command user interface handler module associated with the interface generating module, a user input made via a user interface in communication with the processor; and
performing processing associated with applying, with the command user interface handler module, the user input to the user interface screen.

6. The method of claim 1, wherein the performing processing associated with comparing, with the rules engine module, the green screen data to a rule to determine whether a match between the green screen data and the rule exists comprises:
performing processing associated with reading, with the roles engine module, the green screen data; and
performing processing associated with identifying, with the rules engine module, data associated with an information type defined by the rule in the green screen data.

7. The method of claim 1, wherein the virtual control object is selected from a group consisting of a calendar object, a map object, and a spreadsheet object.

8. The method of claim 1, wherein the performing processing associated with generating, with the interface generating module, the user interface screen including the green screen data and the modification comprises:
performing processing associated with creating, with a presentation layer module associated with the interface generating module, a user interface control associated with the green screen data;
performing processing associated with determining, with the presentation layer module, a placement for the user interface control, wherein the modification comprises the user interface control and the placement; and
performing processing associated with placing, with the presentation layer module, the user interface control on the user inter/ace screen according to the placement.

9. The method of claim 1, wherein the modification comprises a graphical user interface element.

10. The method of claim 1, wherein the modification comprises a graphical element.

11. The method of claim 1, wherein the performing processing associated with causing, with the interface generating module, the user interface screen to be displayed on a display comprises generating a webpage comprising the user interface screen.

12. The method of claim 1, further comprising:
performing processing associated with receiving, with the interface generating module, a request to modify the user interface screen from a user interface in communication with the interface generating module;
performing processing associated with determining, with the interface generating module, a modification based on the request to be applied to the green screen data;
perforating processing associated with generating, with the interface generating module, a modified user interface screen including the green screen data and the modification based on the request; and
perforating processing associated with causing, with the interface generating module, the modified user interface screen to be displayed on a display.

13. A system comprising:
an interface generating module in communication with a processor and a database, the interface generating module constructed and arranged to:
receive green screen data;
determine a modification to be applied to the green screen data;
generate user interface screen including the green screen data and the modification; and
cause the user interface screen to be displayed on a display,
wherein the interface generating module is constructed and arranged to receive the green screen data via a direct connection with a mainframe,
wherein the interface generating module is constructed and arranged to generate the user interface screen including the green screen data and the modification by:
sending, with a virtual screen layout module associated with the interface generating module, the green screen data to a rules engine module associated with the interface generating module;
receiving, with the virtual screen layout module, a virtual control object from the rules engine module, the virtual control object comprising scraped green screen data and being associated with a visual element of the user interface screen;
creating, with the virtual screen layout module, a screen interaction for the virtual control object; and
sending, with the virtual screen layout module, a new screen event including the screen interaction to a presentation layer module associated with the interface generating module,
wherein the interface generating module is further constructed and arranged to generate the user interface screen including the green screen data and the modification by:
receiving, with the rules engine module, the green screen data;
comparing, with the rules engine module, the green screen data to a rule to determine whether a match between the green screen data and the rule exists;
when the match exists, generating, with the rules engine module, the virtual control object associated with the match; and
sending, with the rules engine module, the visual control object to the virtual screen layout module,
wherein the interface generating module is further configured m generate the virtual control object associated with the ranch by:
creating, with the rules engine module, a virtual control object of a type associated with the rule; and
incorporating, with the rules engine module, the identified data associated with the information type into the virtual control object.

14. The system of claim 13, wherein the interface generating module is constructed and arranged to receive the green screen data via a network.

15. The system of claim 13, wherein the interface generating module is constructed and arranged to receive and/or determine the modification to be applied to the green screen data by:
reading, with a setting module associated with the interface generating module, configuration information;
determining, with the setting module, a component setting class from the configuration information;
extracting, with the setting module a setting for the component setting class, wherein the setting is the modification; and
storing, with the setting module, the setting in a session profile in the database.

16. The system of claim 13, wherein the interface generating module is constructed and arranged to receive and/or determine the modification to be applied to the green screen data by receiving a modification from a user input made via a user interface in communication with the processor.

17. The system of claim 13, further comprising a command user interface handler module associated with the interface generating module constructed and arranged to:
receive a user input made via a user interface in communication with the processor; and
apply the user input to the user interface screen.

18. The system of claim 13, wherein the interface generating module is further configured to compare the green screen data to a rule to determine whether a match be-tween the green screen data and the rule exists by:
reading, with the rules engine module, the green screen data; and
identifying, with the rules engine module, data associated with an information type defined by the rule in the green screen data.

19. The system of claim 13, wherein the virtual control object is selected from a group consisting of a calendar object, a map object, and a spreadsheet object.

20. The system of claim 13, wherein the interface generating module is constructed and arranged to generate the user interface: screen including the green screen data and the modification by:
creating, with a presentation layer module associated with the interface generating module, a user interface control associated with the green screen data;
determining, with the presentation layer module, a placement for the user interface control, wherein the modification comprises the user interface control stud the placement; and
placing, with the presentation layer module, the user interface control on the user interface screen according to the placement.

21. The system of claim 13, wherein the modification comprises a graphical user interface element.

22. The system of claim 13, wherein the modification comprises a graphical element.

23. The system of claim 13, wherein the interface generating module is constructed and arranged to cause the user interface screen to be displayed on a display by generating a webpage comprising the user interface screen.

24. The system of claim 13, wherein the interface generating module is further constructed and arranged to: receive a request to modify, the user interface screen from a user interface in communication with the interface generating module;
determine a modification based on the request to be applied to the green screen data;
generate a modified user interface screen including the green screen data and the modification based on the request; and
cause the modified user interface screen to be displayed on a display.

* * * * *